United States Patent
Shi et al.

(10) Patent No.: US 10,473,473 B2
(45) Date of Patent: Nov. 12, 2019

(54) RANGING SYSTEM AND RANGING METHOD

(71) Applicant: NORTHWEST INSTRUMENT INC., Budd Lake, NJ (US)

(72) Inventors: Xin Shi, Shanghai (CN); David Xing, Shanghai (CN)

(73) Assignee: NORTHWEST INSTRUMENT INC., Budd Lake, NJ (US)

(*) Notice: Subject to any disclaimer, the term of this patent is extended or adjusted under 35 U.S.C. 154(b) by 0 days.

(21) Appl. No.: 15/503,222

(22) PCT Filed: Mar. 18, 2015

(86) PCT No.: PCT/CN2015/074461
§ 371 (c)(1),
(2) Date: Sep. 11, 2017

(87) PCT Pub. No.: WO2016/131203
PCT Pub. Date: Aug. 25, 2016

(65) Prior Publication Data
US 2018/0023962 A1    Jan. 25, 2018

(30) Foreign Application Priority Data
Feb. 16, 2015  (CN) .......................... 2015 1 0084983

(51) Int. Cl.
*G01C 21/34* (2006.01)
*G01B 3/12* (2006.01)
(Continued)

(52) U.S. Cl.
CPC .......... *G01C 21/3407* (2013.01); *G01B 3/12* (2013.01); *G01B 5/02* (2013.01); *G01C 21/367* (2013.01);
(Continued)

(58) Field of Classification Search
CPC .............. G01C 21/3407; G01C 21/367; G01C 21/3688; G01B 3/12; G01B 5/02; H04W 4/80; H04W 84/18
See application file for complete search history.

(56) References Cited

U.S. PATENT DOCUMENTS

| | | | |
|---|---|---|---|
| 6,532,672 B1* | 3/2003 | Gottlieb | G01B 3/12 33/124 |
| 2003/0037448 A1* | 2/2003 | Saksa | G01B 3/12 33/35 |

(Continued)

FOREIGN PATENT DOCUMENTS

| | | |
|---|---|---|
| CN | 2529198 Y | 1/2003 |
| CN | 102236030 A | 11/2011 |

(Continued)

OTHER PUBLICATIONS

Klose et al., DE 19508264, Feb. 1, 1996 (machine translation).*
International Search Report for Application No. PCT/CN2015/074461, dated Nov. 10, 2015.

*Primary Examiner* — Courtney D Heinle
(74) *Attorney, Agent, or Firm* — Anova Law Group, PLLC (57) ABSTRACT

The present invention relates to ranging system and ranging method, the ranging system includes: a ranging apparatus and a terminal device (3), wherein the ranging apparatus includes: a measuring wheel (1), a rotating shaft disposed on the measuring wheel (1), and an electronic counter (2) connected to the rotating shaft and used to obtain distance information of the measuring wheel; wherein the ranging apparatus or the terminal device (3) further includes an angle sensor; communication module being arranged on the terminal device (3) and the ranging apparatus, respectively; the terminal device (3) including data processing module configured to generate a traveling trajectory diagram of the (Continued)

measuring wheel, in real time, based on the distance information from the electronic counter (2) and the angle information from the angle sensor. Thereby, a traveling trajectory diagram can also be generated in real time on the basis that a ranging function is achieved, such that working efficiency is effectively improved. A function of marking lines according to a predesigned diagram in a construction site can also be achieved by cooperating with a marker (4), and the present invention has a simple structure and is lightweight and flexible.

17 Claims, 5 Drawing Sheets

(51) Int. Cl.
- *G01B 5/02* (2006.01)
- *G01C 21/36* (2006.01)
- *H04W 4/80* (2018.01)
- *H04W 4/18* (2009.01)
- *H04W 84/18* (2009.01)

(52) U.S. Cl.
CPC ........... *G01C 21/3688* (2013.01); *H04W 4/80* (2018.02); *H04W 84/18* (2013.01)

(56) References Cited

U.S. PATENT DOCUMENTS

| | | | | |
|---|---|---|---|---|
| 2005/0219517 | A1* | 10/2005 | Tanaka | G01J 1/42 356/221 |
| 2006/0070250 | A1* | 4/2006 | Siraky | G01B 3/12 33/1 PT |
| 2009/0217542 | A1* | 9/2009 | Watkins | A63C 19/06 33/775 |
| 2014/0063510 | A1* | 3/2014 | Seifert | G01B 5/008 356/635 |
| 2014/0317944 | A1* | 10/2014 | Kumagai | G01C 5/00 33/773 |
| 2017/0082414 | A1* | 3/2017 | Thorp | G01B 3/12 |

FOREIGN PATENT DOCUMENTS

| | | |
|---|---|---|
| CN | 102506683 A | 6/2012 |
| CN | 103234445 A | 8/2013 |
| CN | 104111050 A | 10/2014 |
| CN | 204514232 U | 7/2015 |
| DE | 4318939 A1 | 12/1994 |
| DE | 19536597 A1 | 3/1997 |
| EP | 2796832 | * 3/2014 |

* cited by examiner

RANGING SYSTEM AND RANGING METHOD

TECHNICAL FIELD

The present invention relates to the field of surveying and mapping, and more particularly, to a ranging system and a ranging method.

BACKGROUND

Currently, people need to use ranging device to measure and plan the route and the area in all aspects of life and work, such as in the field of construction, road engineering, transportation, pipeline laying, landscape areas etc. The most commonly used ranging device is the measuring wheel.

The existing measuring wheel usually only has the function of ranging, its basic principle is to calculate the number of rotation based on the rolling of the measuring wheel and with the help of mechanical gear counter or electronic counter, so as to realize distance measurement. This method usually only measures the length of the traveling trajectory between two points, and then the drawings need to be plotted one segment by one segment. Thus, this method wastes time and the measurement accuracy is very low. Therefore, only limited function may be achieved in actual use.

SUMMARY

The technical problem solved by the present invention is to provide a ranging system which could achieve ranging function and generate a traveling trajectory diagram in real time simultaneously.

The preferred embodiments of the present invention could mark the actual scene such as marking line or marking points for a predetermined traveling trajectory on a predesigned drawing, and could prompt direction and distance.

To achieve the above-mentioned technical purpose, the present invention proposes the following technical solutions:

A ranging system comprises a ranging apparatus and a terminal device, wherein the ranging apparatus comprises a measuring wheel, a rotating shaft disposed on the measuring wheel, and an electronic counter connected to the rotating shaft and used to obtain distance information, in real time, of the route which the measuring wheel has already traveled; wherein the ranging apparatus or the terminal device further comprises an angle sensor configured to obtain angle information, in real time, when the measuring wheel is traveling;

communication modules are arranged on the terminal device and the ranging apparatus, respectively, to transmit data between the ranging apparatus and the terminal device;

the terminal device includes data processing module configured to generate a traveling trajectory diagram of the measuring wheel, in real time, based on the distance information from the electronic counter and the angle information from the angle sensor.

Advantageously, the terminal device further comprises a storage configured to store a predesigned traveling trajectory diagram; the data processing module is further configured to monitor, on the basis of the predesigned traveling trajectory diagram, the current traveling trajectory of the measuring wheel determined based on the distance information and the angle information, and outputs deviation data when the current traveling trajectory of the measuring wheel deviates from the predesigned traveling trajectory diagram; the terminal device further comprises a prompt module configured to perform direction and/or distance prompt based on the deviation data to indicate the user to correct the current traveling route of the measuring wheel, and indicate the user to mark on the traveling route of the measuring wheel according to the predesigned traveling trajectory diagram.

Advantageously, the terminal device further comprises a storage configured to store a predesigned traveling trajectory diagram; the data processing module is further configured to monitor, on the basis of the predesigned traveling trajectory diagram, the current traveling trajectory of the measuring wheel determined based on the distance information and the angle information, and outputs deviation data when the current traveling trajectory of the measuring wheel deviates from the predesigned traveling trajectory diagram; the terminal device further comprises a prompt module configured to perform direction and/or distance prompt based on the deviation data to indicate the user to correct the current traveling route of the measuring wheel; the ranging apparatus further comprises a marker configured to mark on the traveling route of the measuring wheel according to the instruction of the user or according to the instruction of the data processing module.

Advantageously, the angle sensor is an electronic compass disposed in the ranging apparatus and connected to the communication module of the ranging apparatus.

Advantageously, the angle sensor is a gyroscope disposed in the terminal device and connected to the data processing module.

Advantageously, the ranging apparatus further comprises a holder for fixing the terminal device.

Advantageously, the terminal device further comprises a camera configured to obtain, in real time, a scene image in the traveling direction of the measuring wheel, and the prompt module is configured to provide direction and/or distance prompt on the scene image.

Advantageously, the communication module is a wireless communication module or a wired communication module, wherein the interface of the wired communication module is RS232, RS485, I2C, SPI or CAN, and the communication way of the wireless communication module is Bluetooth, WIFI, Zigbee or RF communication.

Advantageously, the ranging system further comprises a cloud server, the terminal device and the cloud server being networked and the cloud server being used for storing and sharing the data sent by the terminal device, and the data sent by the terminal device including: distance information from the electronic counter, angle information from the angle sensor and/or a first traveling trajectory diagram and the terminal device being capable of obtaining predesigned traveling trajectory diagram from the cloud server.

Advantageously, the data processing module is configured to obtain the area of a closed graphic by meshing the closed graphic and calculating the area of the meshes contained by the closed graphic, when the first traveling trajectory diagram is a closed graphic.

Advantageously, the terminal device is a smart cellphone, a computer or handheld equipment.

The embodiments of the present invention also provides a ranging method based on the above-mentioned ranging system, the method comprises: an electronic counter obtaining, in real time, distance information which a measuring wheel has already traveled, and an angle sensor obtaining, in real time, angle information of the measuring wheel, when the measuring wheel is traveling; transmitting the distance information and the angle information to a data processing module; the data processing module generating, in real time, a traveling trajectory diagram of the measuring wheel, in real time, based on the distance information and the angle information.

Advantageously, the ranging method further comprises: storing a predesigned traveling trajectory diagram in the terminal device; the data processing module monitoring, on the basis of the predesigned traveling trajectory diagram, the current traveling trajectory of the measuring wheel determined based on the distance information and the angle information, and outputs deviation data when the current traveling trajectory of the measuring wheel deviates from the predesigned traveling trajectory diagram; prompting direction and/or distance based on the deviation data to indicate the user to correct the current traveling route of the measuring wheel, and indicate the user to mark on the traveling route of the measuring wheel according to the predesigned traveling trajectory diagram.

Advantageously, the ranging method further comprises: storing a predesigned traveling trajectory diagram in the terminal device; the data processing module monitoring, on the basis of the predesigned traveling trajectory diagram, the current traveling trajectory of the measuring wheel determined based on the distance information and the angle information, and outputs deviation data when the current traveling trajectory of the measuring wheel deviates from the predesigned traveling trajectory diagram; prompting direction and/or distance based on the deviation data to indicate the user to correct the current traveling route of the measuring wheel; and a marker disposed in the ranging apparatus marking on the traveling route of the measuring wheel according to the instruction of the user or according to the instruction of the data processing module.

Advantageously, the ranging method further comprises: obtaining, in real time, a scene image in the traveling direction of the measuring wheel, and providing direction and/or distance prompt on the scene image.

Compared with the prior art, the invention has the advantages that:

1. The invention adopts the cooperation of the electronic counter and the angle sensor to generate the drawing of the traveling trajectory, in real time, on the terminal device by using the data measured by the ranging apparatus, which not only achieves the purpose of measuring the distance, but also generates the drawing of the traveling trajectory in real time, and thus the work efficiency is obviously improved;

2. The terminal device of the invention is further provided with a camera, and the terminal device could combine the information recorded by the camera with the trajectory on the drawing to complete the work of marking line or points for the construction site, and route correction could be applied in the process of marking;

3. The invention has the advantages of simple structure, lightness, flexibility and convenient use.

DESCRIPTION OF REFERENCE NUMERALS

| 1 - Measuring wheel | 2 - Electronic Counter |
|---|---|
| 3 - Terminal Device | 4 - Marker |

DETAILED DESCRIPTION

The invention will now be described in further detail with reference to the accompanying drawings and specific embodiments, which should not be construed as limiting the invention.

Figure 1:
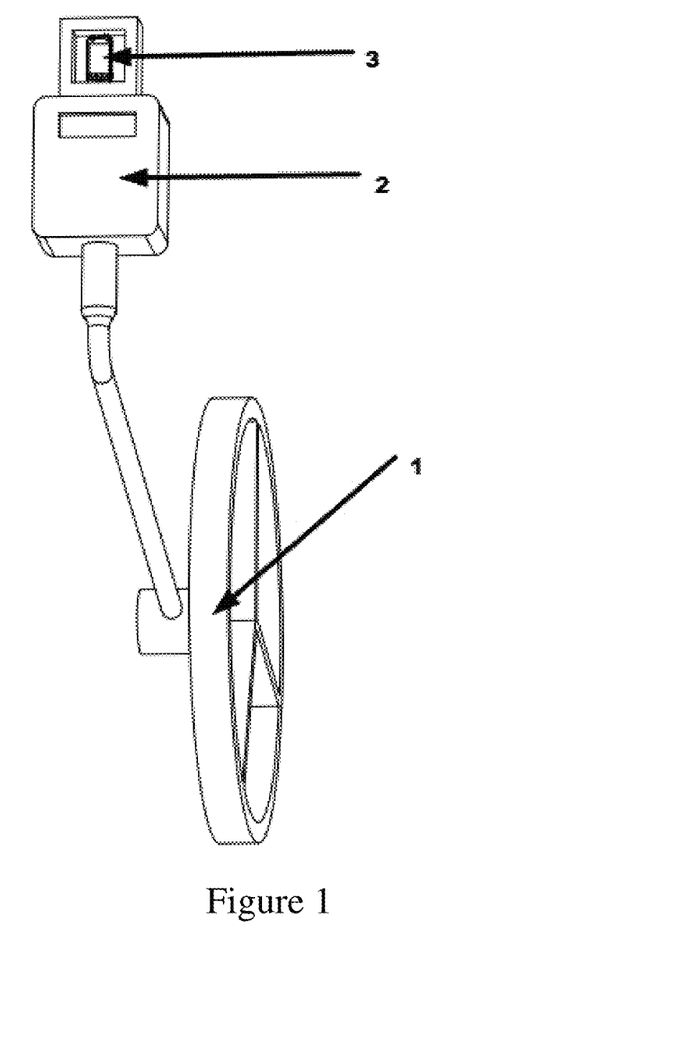
FIG. 1 is a schematic structural view of a ranging system according to an embodiment of the present invention.
Figure 2:
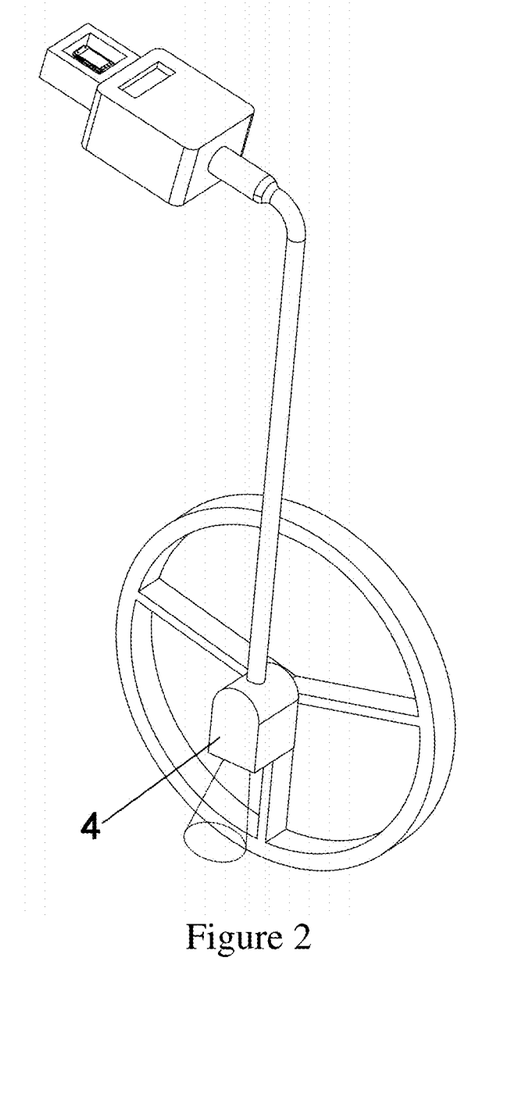
FIG. 2 is a schematic structural view of a ranging system according to another embodiment of the present invention.

FIG. 1 is a schematic structural view of a ranging system according to an embodiment of the present invention and FIG. 2 is a schematic structural view of a ranging system according to another embodiment of the present invention.

As shown in FIG. 1, the ranging system according to the present invention comprises a ranging apparatus and a terminal device 3, wherein the ranging apparatus comprises a measuring wheel 1, a rotating shaft disposed on the measuring wheel 1, and an electronic counter connected to the rotating shaft and used to obtain distance information of the measuring wheel. A data processing module is provided in the terminal device 3 and communication modules are arranged both on the terminal device and the ranging apparatus, the ranging apparatus or the terminal device further comprises an angle sensor. By using this communication module, the data processing module receives the distance information from the electronic counter and the angle information from the angle sensor, and performs calculation based on the distance information and the angle information to plot, in real time, a first traveling trajectory diagram which the measuring wheel has already traveled on the displayer of the terminal device. In embodiments of the present invention, the angle sensor may be an electronic compass disposed in the ranging apparatus and connected to the communication module of the ranging apparatus, and also may be a gyroscope disposed in the terminal device and connected to the communication module.

The present embodiment adopts the cooperation of the electronic counter and the angle sensor to generate the drawing of the traveling trajectory, in real time, on the terminal device by using the data measured by the ranging apparatus, which not only achieves the purpose of measuring the distance, but also generates the drawing of the traveling trajectory in real time, and thus the work efficiency is effectively improved.

In one embodiment of the present invention, the ranging system may be used to mark lines or points for the construction site. For example, a predesigned traveling trajectory diagram may be stored in a storage of the terminal device, the data processing module is configured to determine current traveling trajectory based on the distance information and the angle information, monitor the determined current traveling trajectory of the measuring wheel on the basis of the predesigned traveling trajectory, and outputs the deviation between the current traveling trajectory and the predesigned traveling trajectory diagram as deviation data when the current traveling trajectory of the measuring wheel deviates from the predesigned traveling trajectory. The deviation data may be, for example, angle and distance data for which the measuring wheel needs to be adjusted from the current location to the predesigned trajectory.

The terminal device may further comprise a prompt module which receives the above mentioned deviation data and is configured to perform direction and/or distance prompt based on the deviation data to indicate the user to correct the current traveling route and when the above mentioned predesigned traveling trajectory diagram has marking points or marking lines, the prompt module may prompt or indicate the user to use a separate marker to mark points or lines on the traveling route of the measuring wheel based on the marking points or marking lines.

In another embodiment of the present invention, the marker is disposed on the ranging apparatus, for example, the marker is connected with the rotating shaft such that the user does not need additional marker, on the contrary, the user could instruct the marker to mark points or lines at the predetermined location when the prompt module prompts that the current location needs to be marked. The marker may also use the data processing module to compare the current traveling trajectory with the predesigned traveling trajectory diagram and if the data processing unit determines that the current location needs to be marked, then the marking instruction is sent to the marker via the communication module, so as to mark points or lines for the measuring site automatically. Referring to FIG. 2, in FIG. 2 a schematic diagram illustrating that the marker 4 is connected to the rotating shaft of the ranging apparatus is shown.

In the present embodiment, for the predesigned traveling trajectory on the predesigned drawing, marking such as marking lines or points for actual scene can be achieved, and direction and distance can be prompted.

Figure 3:
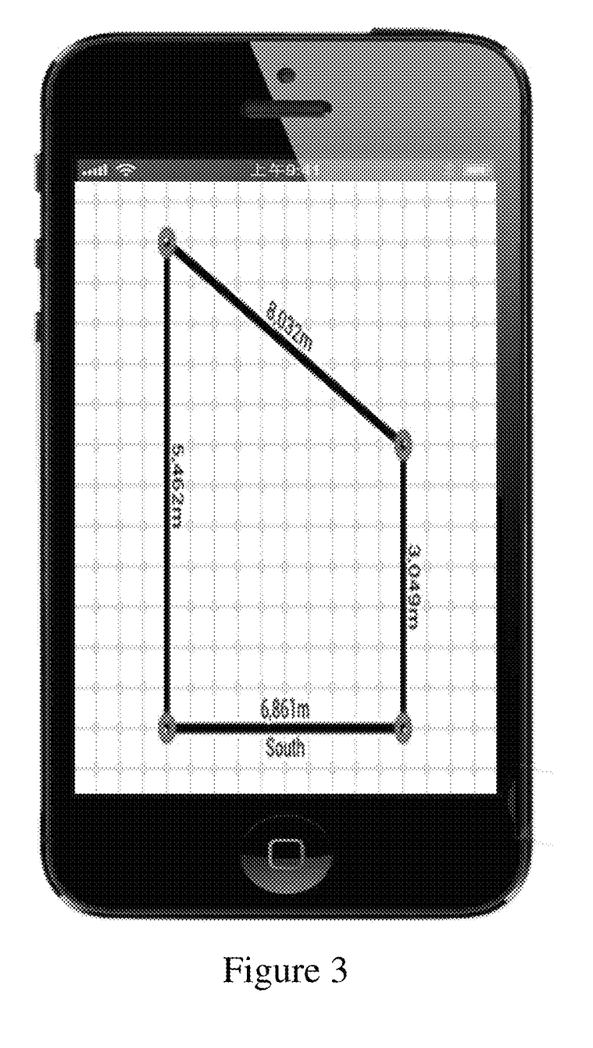
FIG. 3 is a schematic diagram of a regular traveling trajectory diagram generated by a ranging system according to an embodiment of the present invention.
Figure 4:
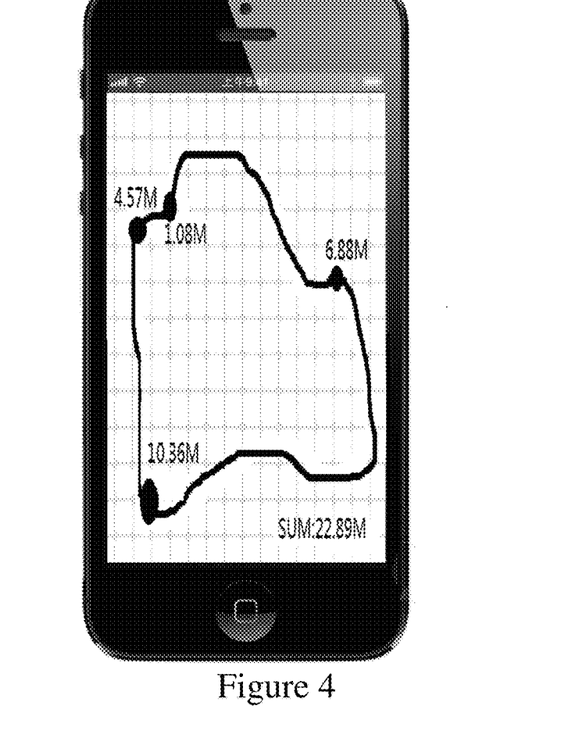
FIG. 4 is a schematic diagram of an irregular and continuous traveling trajectory diagram generated by a ranging system according to an embodiment of the present invention.

FIG. 3 is a schematic diagram of a regular traveling trajectory diagram generated by a ranging system according to an embodiment of the present invention; FIG. 4 is a schematic diagram of an irregular and continuous traveling trajectory diagram generated by a ranging system according to an embodiment of the present invention. As shown in FIG. 3 and FIG. 4, the embodiment according to the present invention may measure regular and irregular route continuously and generate the traveling trajectory diagram in real time.

As shown in FIG. 1 and FIG. 2, a holder for fixing the terminal device 3 and connected to the side end of the electronic counter 2 is provided in the ranging apparatus. The holder may facilitate the measuring process, maintain a stable signal transmission and avoid the measuring error caused by the angle sensor at the same time. In this situation, the communication module in the ranging apparatus and the terminal device 3 may be wired communication module, such as RS 232, RS485, I2C, SPI or CAN. Although FIG. 2 shows that the holder is arranged on the side end of the electronic counter 2, the present invention is not limited thereto; on the contrary the present invention contains all the scope which could stably connect the terminal device 3 to the electronic counter 2.

Although FIG. 1 and FIG. 2 shows the scene in which the terminal device 3 is fixed on the ranging apparatus via the holder, but the present invention is not limited thereto. Instead, the terminal device does not have to be fixed on the ranging apparatus to obtain distance information and angle information by the way of wireless communication by using the wireless communication module disposed in the ranging apparatus and the terminal device, the communication way of the wireless communication module is Bluetooth, WIFI, Zigbee or RF communication.

The storage in the terminal device according to the present invention may be further used to store distance information, angle information and the traveling trajectory diagram generated by the data processing module to facilitate retrieving later. The terminal device in the embodiment of the present invention is a smart cellphone, a computer or handheld equipment.

Figure 5:
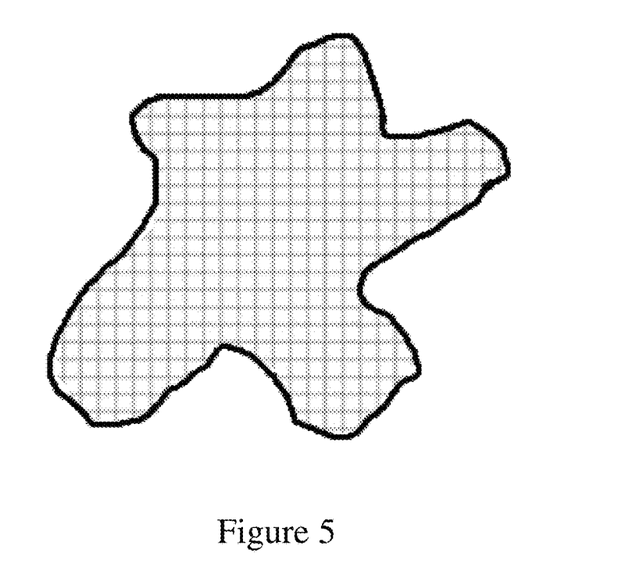
FIG. 5 is a schematic diagram illustrating how the ranging system according to the present invention calculates an area of a traveling trajectory by using mesh computing.

As shown in FIG. 5, in an embodiment of the present invention, the data processing module is configured to obtain area of a closed graphic by meshing the closed graphic and calculating the area of the meshes contained by the closed graphic, when the generated traveling trajectory diagram is a closed graphic, so that the actual area of the closed graphic enclosed by the measured trajectory may be obtained. Generally speaking, the smaller the mesh used when meshing the closed graphic is, the higher is the computation accuracy of area of the closed graphic.

The ranging system according to the present invention may further comprise a cloud server, the terminal device and the cloud server are connected to Internet, the cloud server is used for storing and sharing the data sent by the terminal device, the data includes: distance information from the electronic counter, angle information from the angle sensor and/or the generated traveling trajectory diagram and the terminal device is capable of obtaining predesigned traveling trajectory diagram from the cloud server. In this manner, the stored data may be retrieved in real time and the testing data or drawing may be shared with other engineering staff to effectively improve the work quality and efficiency. The traveling trajectory generated by the terminal device and uploaded to the cloud server may be the predesigned traveling trajectory diagram to be obtained.

In a preferred embodiment, the terminal device is further provided with a camera, the data processing module may combine the scene image obtained by the camera with the trajectory in the drawing and display them on the displayer, and prompt module may provide the above-mentioned direction and/or distance prompt on the scene image to indicate the user to correct the traveling route and to indicate the user to mark points or lines for the construction site.

Figure 6:
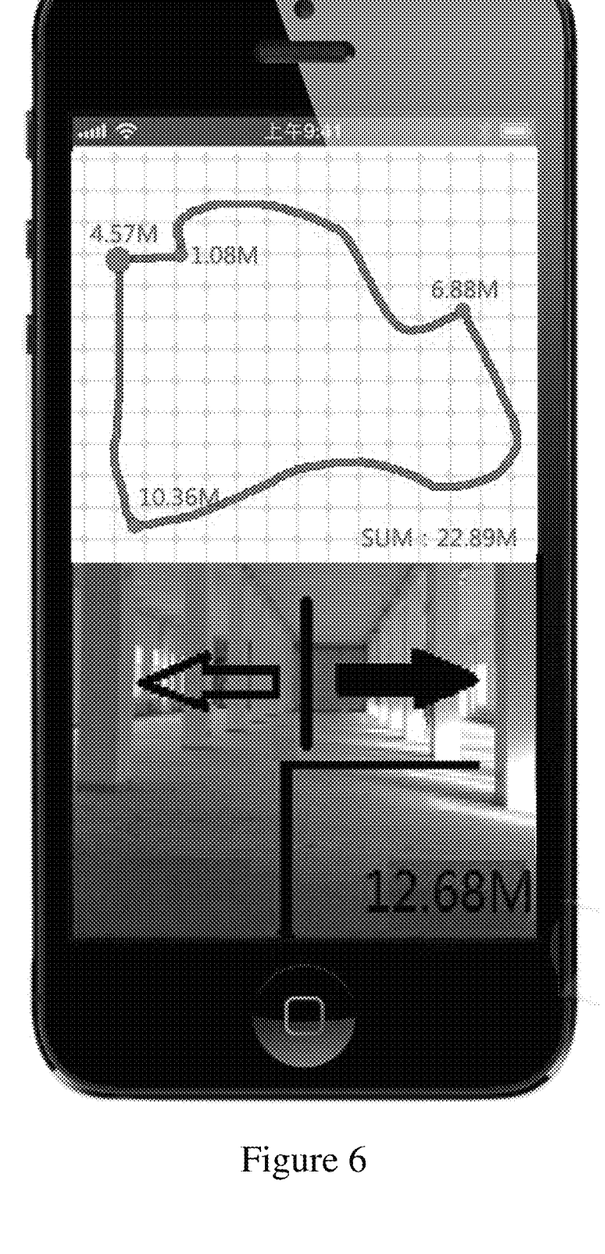
FIG. 6 is a schematic diagram illustrating how the ranging system according to an embodiment of the present invention prompts during a traveling process of a measuring wheel.

When the predesigned traveling trajectory diagram stored in the terminal device or the cloud server is retrieved, the staff member may mark on the actual work site based on the traveling trajectory in the drawings. Referring to FIG. 6, a traveling trajectory diagram, direction deviation prompt and distance deviation prompt are combined displayed on the scene image, the traveling trajectory diagram herein may be a predesigned traveling trajectory diagram obtained from the cloud server.

The present invention also provides a ranging method based on the above-mentioned ranging system, the method comprises: the electronic counter obtaining, in real time, distance information which a measuring wheel has already traveled, and an angle sensor disposed in the ranging apparatus or the terminal device obtaining, in real time, angle information of the measuring wheel; transmitting the distance information and the angle information to a data processing module; the data processing module generating, in real time, a traveling trajectory diagram of the measuring wheel, based on the distance information and the angle information.

The present embodiment adopts the cooperation of the electronic counter and the angle sensor to generate the drawing of the traveling trajectory, in real time, on the terminal device by using the data measured by the ranging apparatus, which not only achieves the purpose of measuring the distance, but also generates the drawing of the traveling trajectory in real time, and thus the work efficiency is effectively improved;

In an embodiment of the present invention, the ranging method further comprises: storing a predesigned traveling trajectory diagram in the terminal device; the data processing module monitor, in real time, the current traveling trajectory of the measuring wheel determined based on the distance information and the angle information on the basis of the predesigned traveling trajectory, and outputs the deviation data when the current traveling trajectory deviates from the predesigned traveling trajectory diagram; prompting direction and/or distance based on the deviation data to indicate the user to correct the current traveling route, and to indicate the user to mark on the traveling route of the measuring wheel according to the predesigned traveling trajectory diagram.

In another embodiment of the present invention, the ranging method further comprises: storing a predesigned traveling trajectory diagram in the terminal device; the data processing module monitor the current traveling trajectory of the measuring wheel determined based on the distance information and the angle information on the basis of the predesigned traveling trajectory, and outputs the deviation data when the current traveling trajectory deviates from the predesigned traveling trajectory diagram; prompting direction and/or distance based on the deviation data to indicate the user to correct the current traveling route, and to indicate the user to use a marker disposed in the ranging apparatus to mark on the traveling route of the measuring wheel according to the instruction of the user or according to the instruction of the data processing module.

The preferred embodiments of the present invention could mark the actual scene such as marking line or marking points for a predetermined traveling trajectory on a predesigned drawing, and could prompt direction and distance.

In an embodiment of the present invention, the ranging method further comprises: obtaining, in real time, a scene image in the traveling direction of the measuring wheel, and providing direction and/or distance prompt on the scene image. The ranging method of the present embodiment may indicate the user to correct the traveling route and indicate the user to mark points or lines for the construction site.

The above embodiments are merely exemplary embodiments of the present invention and are not intended to limit the scope of the invention as defined in the appended claims. It will be apparent to those skilled in the art that various modifications or equivalent substitutions may be made to the invention within the spirit and scope of the invention, which are to be considered within the scope of the invention.

What is claimed is:

1. A ranging system, comprising:
a terminal device;
a ranging apparatus, the ranging apparatus comprises including:
   a measuring wheel,
   a rotating shaft disposed on the measuring wheel, and
   an electronic counter connected to the rotating shaft and configured to obtain distance information, in real time, of a route which the measuring wheel has already traveled; and
   an angle sensor configured to obtain angle information, in real time, when the measuring wheel is traveling;

wherein:
the terminal device and the ranging apparatus are configured to transmit data between each other;
the terminal device is configured to generate a traveling trajectory diagram of the measuring wheel, in real time, based on the distance information from the electronic counter and the angle information from the angle sensor; and
the terminal device is further configured to compare a current traveling trajectory of the measuring wheel, in real time, with a predesigned traveling trajectory diagram stored on the terminal device, and output deviation data in response to the current traveling trajectory of the measuring wheel deviating from the predesigned traveling trajectory diagram.

2. The ranging system according to claim 1, wherein:
the terminal device comprises a storage device configured to store the predesigned traveling trajectory diagram; and
the terminal device is further configured to perform direction and/or distance prompt based on the deviation data to indicate a user to correct the current traveling trajectory of the measuring wheel.

3. The ranging system according to claim 1, wherein:
the terminal device further comprises a storage device configured to store a predesigned traveling trajectory diagram; and
the ranging apparatus further comprises a marker configured to mark on the route of the measuring wheel according to a user instruction or according to a pre-configured rule.

4. The ranging system according to claim 1, wherein the angle sensor is an electronic compass disposed in the ranging apparatus and configured to communicate with the terminal device.

5. The ranging system according to claim 1, wherein the angle sensor is a gyroscope disposed in the terminal device.

6. The ranging system according to claim 1, wherein the ranging apparatus further comprises a holder for fixing the terminal device.

7. The ranging system according to claim 1, wherein:
the terminal device further comprises a camera configured to obtain, in real time, a scene image in a traveling direction of the measuring wheel; and
the terminal device is further configured to display the scene image and provide direction and/or distance prompt on the scene image.

8. The ranging system according to claim 1, wherein the terminal device and the ranging apparatus are configured to transmit data between each other through one of:
a wireless communication module using a Bluetooth, a WIFI, a Zigbee or an RF communication protocol; or
a wired communication channel using an RS232, an RS485, an I2C, an SPI or a CAN protocol.

9. The ranging system according to claim 1, wherein:
the ranging system further comprises a cloud server communicating with the terminal device, the cloud server being configured to store and share data sent by the terminal device;
the data sent by the terminal device includes at least one of: the distance information from the electronic counter, the angle information from the angle sensor, and a first traveling trajectory diagram; and the terminal device is configured to retrieve the predesigned traveling trajectory diagram from the cloud server.

10. The ranging system according to claim 1, wherein the terminal device is further configured to: in response to the traveling trajectory diagram containing a closed trajectory, obtain an area of the closed trajectory by meshing the closed trajectory and calculating the area of meshes contained by the closed trajectory.

11. The ranging system according to claim 1, wherein the terminal device is one of: a smart cellphone, a computer, or a handheld equipment.

12. A ranging method, comprising:
obtaining by an electronic counter, in real time, distance information which a measuring wheel of a ranging device has already traveled;
obtaining by an angle sensor, in real time, angle information of the measuring wheel, when the measuring wheel is traveling;
transmitting the distance information and the angle information to a terminal device;
processing the distance information and the angle information into trajectory data by the terminal device;
generating by the terminal device, in real time, a traveling trajectory diagram of the measuring wheel according to the trajectory data;
comparing a current traveling trajectory of the measuring wheel, in real time, with a predesigned traveling trajectory diagram stored on the terminal device; and
outputting deviation data in response to the current traveling trajectory of the measuring wheel deviating from the predesigned traveling trajectory diagram.

13. The ranging method according to claim 12, further comprising:
storing the predesigned traveling trajectory diagram in the terminal device; and
prompting direction and/or distance based on the deviation data to indicate the user to correct the current traveling route of the measuring wheel.

14. The ranging method according to claim 12, further comprising:
marking, by a maker disposed in the ranging device, on a traveling route of the measuring wheel according to a user instruction or according to a preconfigured rule.

15. The ranging method according to claim 13, further comprising:
obtaining, in real time, a scene image in a traveling direction of the measuring wheel;
displaying the scene image on the terminal device; and
providing direction and/or distance prompt on the scene image.

16. The ranging method according to claim 12, further comprising:
transmitting data to a cloud server, the data including at least one of: the distance information from the electronic counter, the angle information from the angle sensor, and a first traveling trajectory diagram from the terminal device; and
retrieving, by the terminal device, the predesigned traveling trajectory diagram from the cloud server.

17. The ranging method according to claim 12, further comprising:
in response to the traveling trajectory diagram containing a closed trajectory, obtaining an area of the closed trajectory by meshing the closed trajectory and calculating the area of meshes contained by the closed trajectory.

* * * * *